(12) United States Patent
Okamoto et al.

(10) Patent No.: US 10,717,398 B2
(45) Date of Patent: Jul. 21, 2020

(54) CLIP MOUNTING SEAT

(71) Applicant: TOYOTA BOSHOKU KABUSHIKI KAISHA, Aichi-ken (JP)

(72) Inventors: Kenji Okamoto, Aichi-ken (JP); Junpei Kai, Aichi-ken (JP); Misao Suzuki, Gifu-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 79 days.

(21) Appl. No.: 16/139,460

(22) Filed: Sep. 24, 2018

(65) Prior Publication Data

US 2019/0092252 A1  Mar. 28, 2019

(30) Foreign Application Priority Data

Sep. 27, 2017  (JP) .................................. 2017-186433

(51) Int. Cl.
  *B60R 13/02*  (2006.01)
  *F16B 5/06*  (2006.01)
  *F16B 21/06*  (2006.01)

(52) U.S. Cl.
  CPC ...... *B60R 13/0206* (2013.01); *B60R 13/0243* (2013.01); *F16B 5/0657* (2013.01); *B60R 2013/0293* (2013.01); *F16B 21/06* (2013.01)

(58) Field of Classification Search
  CPC .... F16B 5/0657; F16B 21/06; B60R 13/0206; B60R 13/0243; B60R 2013/0293
  See application file for complete search history.

(56) References Cited

U.S. PATENT DOCUMENTS 9,802,552 B2 * 10/2017  Vega Velazquez ... F16B 5/0657
2016/0368433 A1  12/2016  Vega Velazquez et al.

FOREIGN PATENT DOCUMENTS

CN  205064470  3/2016
CN  205589133  9/2016
(Continued)

OTHER PUBLICATIONS

Examination Report, German Patent Office, German Patent Application No. 10 2018 121 656.4, dated Apr. 15, 2020 (with English translation thereof).
(Continued)

*Primary Examiner* — Robert Sandy
(74) *Attorney, Agent, or Firm* — Greenblum & Bernstein, P.L.C.

(57) ABSTRACT

A clip mounting seat includes a mounting base having an outer edge, a mounting hole, and a mounting base-side insertion opening that is included at a part of a hole edge of the mounting hole and through which the clip is inserted to the mounting hole, a wall extending downward from the outer edge and including an insertion-side wall having a wall-side insertion hole communicated with the mounting base-side insertion opening, and a guide member included in the insertion-side wall and extending toward the mounting hole and being adjacent to the wall-side insertion hole and opposite the mounting base-side insertion opening with respect to an insertion direction of the clip. The guide member guides the clip and includes an end portion that is opposite the mounting base-side insertion opening and has a thickness greater than a distance between a leg portion and a support portion of the clip.

15 Claims, 6 Drawing Sheets

(56) References Cited

FOREIGN PATENT DOCUMENTS

| CN | 206468626 | 9/2017 |
| EP | 2 833 004 | 2/2015 |
| JP | 2003-314516 | 11/2003 |
| JP | 2009-299850 | 12/2009 |

OTHER PUBLICATIONS

Office Action in Chinese Patent Application No. 201810996148.3, dated Mar. 11, 2020 (with English translation thereof).

* cited by examiner

US 10,717,398 B2

CLIP MOUNTING SEAT

CROSS REFERENCE TO RELATED APPLICATION

This application claims priority from Japanese Patent Application No. 2017-186433 filed on Sep. 27, 2017. The entire contents of the priority application are incorporated herein by reference.

TECHNICAL FIELD

The present disclosure relates to a clip mounting seat.

BACKGROUND

A clip mounting seat in which a clip is mounted has been known. Such a clip mounting seat includes a mounting seat body in which the clip is mounted and the mounting seat body has a clip stopper hole in which the clip is inserted and stays. An insertion hole is formed continuously from the clip stopper hole and an insertion base portion of the clip is inserted through the insertion hole toward the clip insertion hole. The clip mounting seat includes a stopper piece near the insertion hole, and the clip that is inserted in the clip stopper hole is less likely to be moved out of the clip stopper hole with the stopper piece.

In the above configuration, the stopper piece extends from an upper end of a base included in the clip mounting seat toward the insertion hole. When the clip is inserted into the stopper hole through the insertion hole, the clip presses the stopper piece downwardly and the stopper piece is elastically deformed such that the clip is inserted into the clip stopper hole. However, in the above configuration, the stopper piece has a narrow, thin and elongated shape and is very small with respect to an area of a clip seat body. With such a configuration, when the stopper piece is pressed with the clip, a contact area of the clip seat body and the stopper piece is small. Therefore, the clip may be unstable with respect to the stopper piece and it is difficult to control an insertion force or an insertion direction when the clip presses the stopper piece. Accordingly, the clip may not be inserted straight in the insertion hole but may be tilted with respect to the mounting seat body. If the clip may be inserted through the insertion hole while being tilted with respect to the mounting seat body and mounted in the clip stopper hole while being tilted, such a clip may be easily detached from the clip seat body.

SUMMARY

An objective of the present technology is to provide a clip mounting seat where a clip can be mounted stably with a correct posture and from which the mounted clip is less likely to be detached.

According to the present technology, a clip mounting seat in which a clip is mounted includes a mounting base having an outer edge, a mounting hole in which the clip is mounted, and a mounting base-side insertion opening that is included at a part of a hole edge of the mounting hole and through which the clip is inserted to the mounting hole, a wall extending downward from the outer edge of the mounting base and including an insertion-side wall having a wall-side insertion hole that is communicated with the mounting base-side insertion opening, and a guide member included in the insertion-side wall and extending toward the mounting hole, the guide member being adjacent to the wall-side insertion hole and opposite the mounting base-side insertion opening with respect to an insertion direction in which the clip is inserted, the guide member being configured to guide the clip in the insertion direction and including an end portion that is opposite the mounting base-side insertion opening and has a thickness greater than a distance between a leg portion and a support portion of the clip, the leg portion extending in a flange form in a direction crossing a shaft direction of the clip and the support portion extending in a flange form in the direction crossing the shaft direction and being away upward from the leg portion.

DETAILED DESCRIPTION

Figure 1:
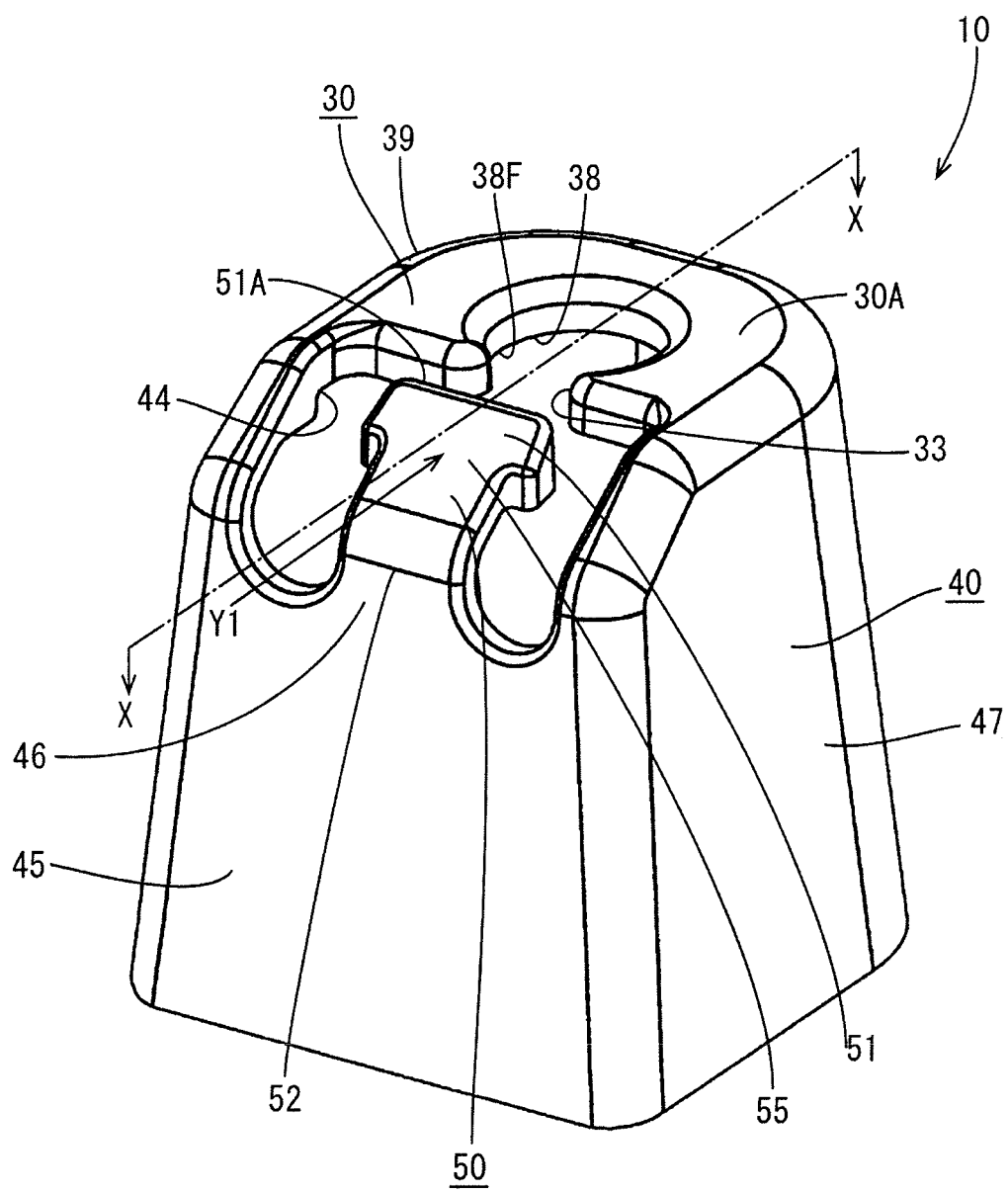
FIG. 1 is a perspective view of a clip mounting seat according to one embodiment of the present technology.

One embodiment of the present technology will be described with reference to FIGS. 1 to 6. In this embodiment section, a clip mounting seat in which a clip is mounted will be described as an example and especially the clip mounting seat including the clip that is used for mounting a vehicular door trim of a vehicle on a vehicular door inner panel will be described. In the following description, a vertical direction represents an up-down direction on the drawing sheets.

Clip mounting seats 10 are included on a vehicular exterior surface of a trim board (not illustrated) included in a vehicular door trim. The trim board and the clip mounting seats 10 are integrally molded with injection molding while using synthetic resin such as polypropylene. The trim board is mounted on a vehicular door inner panel P (see FIG. 6) with a clip 80 that is mounted in the clip mounting seat 10.

As illustrated in FIG. 1, the clip mounting seat 10 includes a mounting base 30, and a wall 40 extending downward from an outer edge 39 of the mounting base 30. The mounting base 30 includes a mounting hole 38 and a mounting base-side insertion opening 33. The mounting hole 38 has the mounting base-side insertion opening 33 at a part of a hole edge 38F of the mounting hole 38. The clip 80 is inserted through the mounting base-side insertion opening 33 and mounted in the mounting hole 38. The mounting base 30 further includes an insertion hole 34 that is communicated with the mounting hole 38 through the mounting base-side insertion opening 33.

As illustrated in FIG. 1, the wall 40 has a tubular shape as a whole and includes an insertion-side wall 45 that is substantially a flat wall, and a curved wall 47 that is curved along an outer edge 39 of the mounting base 30. The insertion-side wall 45 has wall-side insertion holes 44 that are communicated with the mounting base-side insertion opening 33 through the insertion hole 34. The insertion-side wall 45 includes a guide member 50 at an upper middle portion thereof with respect to a width dimension thereof. The guide member 50 is between the wall-side insertion holes 44.

Figure 3:
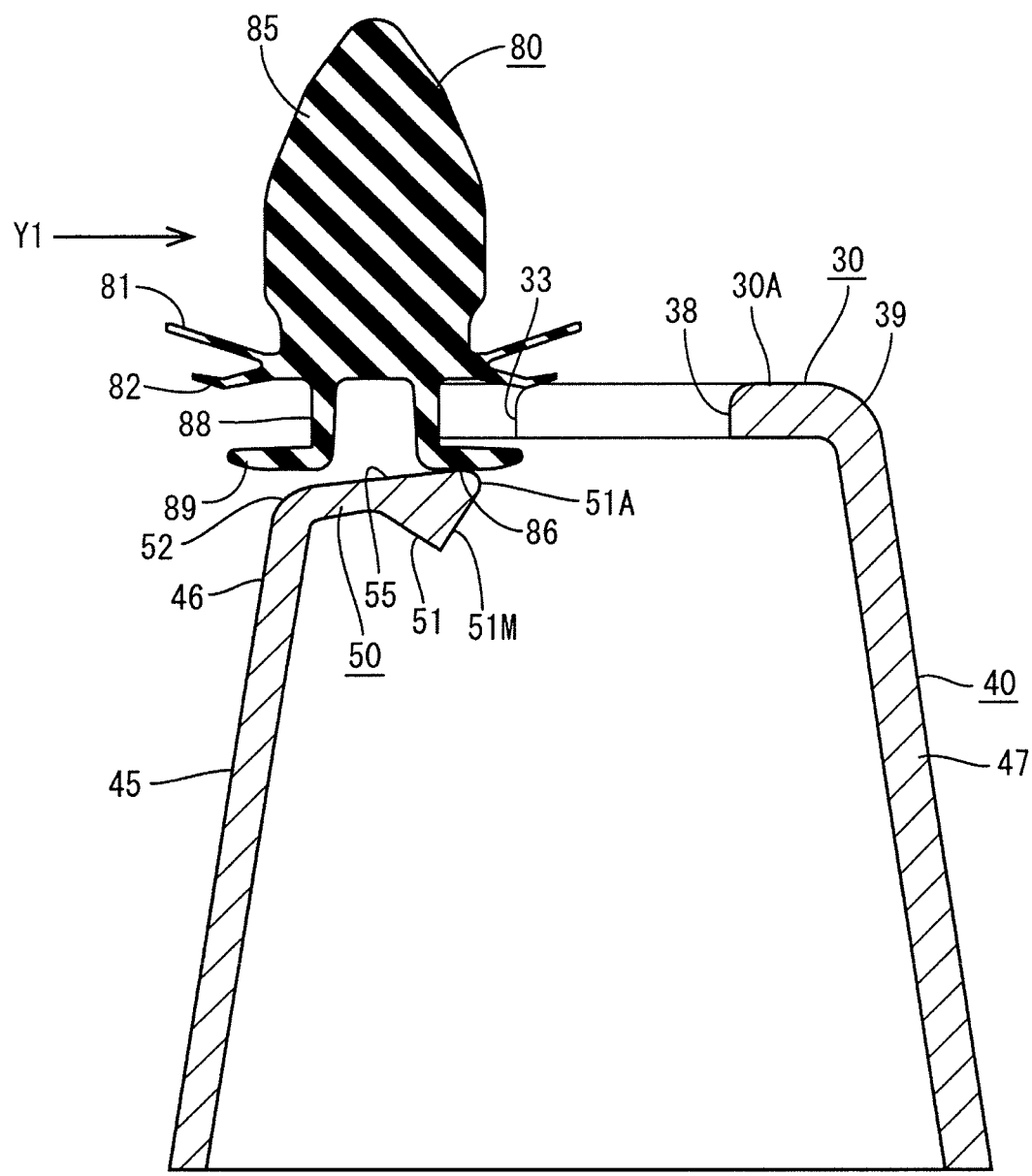
FIG. 3 is a cross-sectional view illustrating the clip mounting seat and the clip that is being mounted in the clip mounting seat while the guide member being elastically deformed by the clip (a cut position is along line X-X in FIG. 1).

The guide member 50 faces the wall-side insertion holes 44. Furthermore, the guide member 50 is opposite the mounting base-side insertion opening 33 through the insertion hole 34 with respect to an insertion direction Y1 of the clip 80. The guide member 50 guides the clip 80 in the insertion direction Y1 to the mounting base-side insertion opening 33 when the clip 80 is inserted in the mounting hole 38. Namely, the guide member 50 is positioned just in front of the mounting base-side insertion opening 33 via the insertion hole 34 and as illustrated in FIG. 3, the mounting hole 38, the mounting base-side insertion opening 33, and the guide member 50 are arranged on a same line in a plan view.

The guide member 50 is a part of the insertion-side wall 45 and extends from an upper edge 46 of the insertion-side wall 45 obliquely and upward toward the mounting base-side insertion opening 33 and the mounting hole 38. Specifically, as illustrated in FIG. 1, the guide member 50 includes a base portion 52 that is continuous from the upper edge 46 of the insertion-side wall 45 and an end portion 51 that is continuous form the base portion 52. The end portion 51 is thicker than the base portion 52. The end portion 51 is inclined to be closer to the mounting hole 38 as it extends upward from the base portion 52. The end portion 51 is gently bent at the base portion 52. The guide member 50 has an inclined surface 55 on an outer surface of the end portion 51 and the inclined surface 55 is inclined with respect to the mounting base 30.

Figure 2:
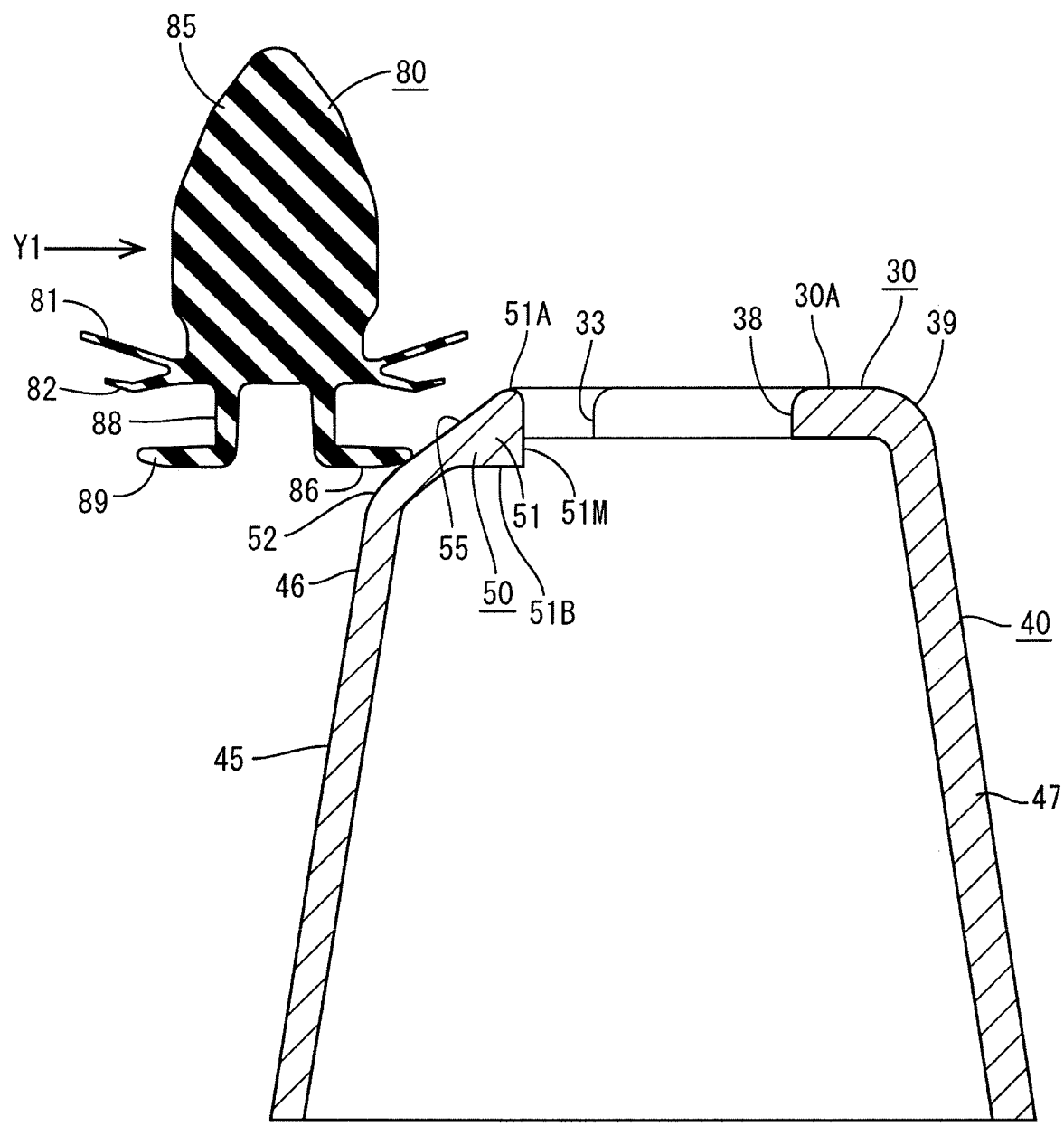
FIG. 2 is a cross-sectional view of the clip mounting seat and a clip before the clip is mounted in the clip mounting seat while a leg portion of the clip being in contact with a guide member (a cut position is along line X-X in FIG. 1).
Figure 4:
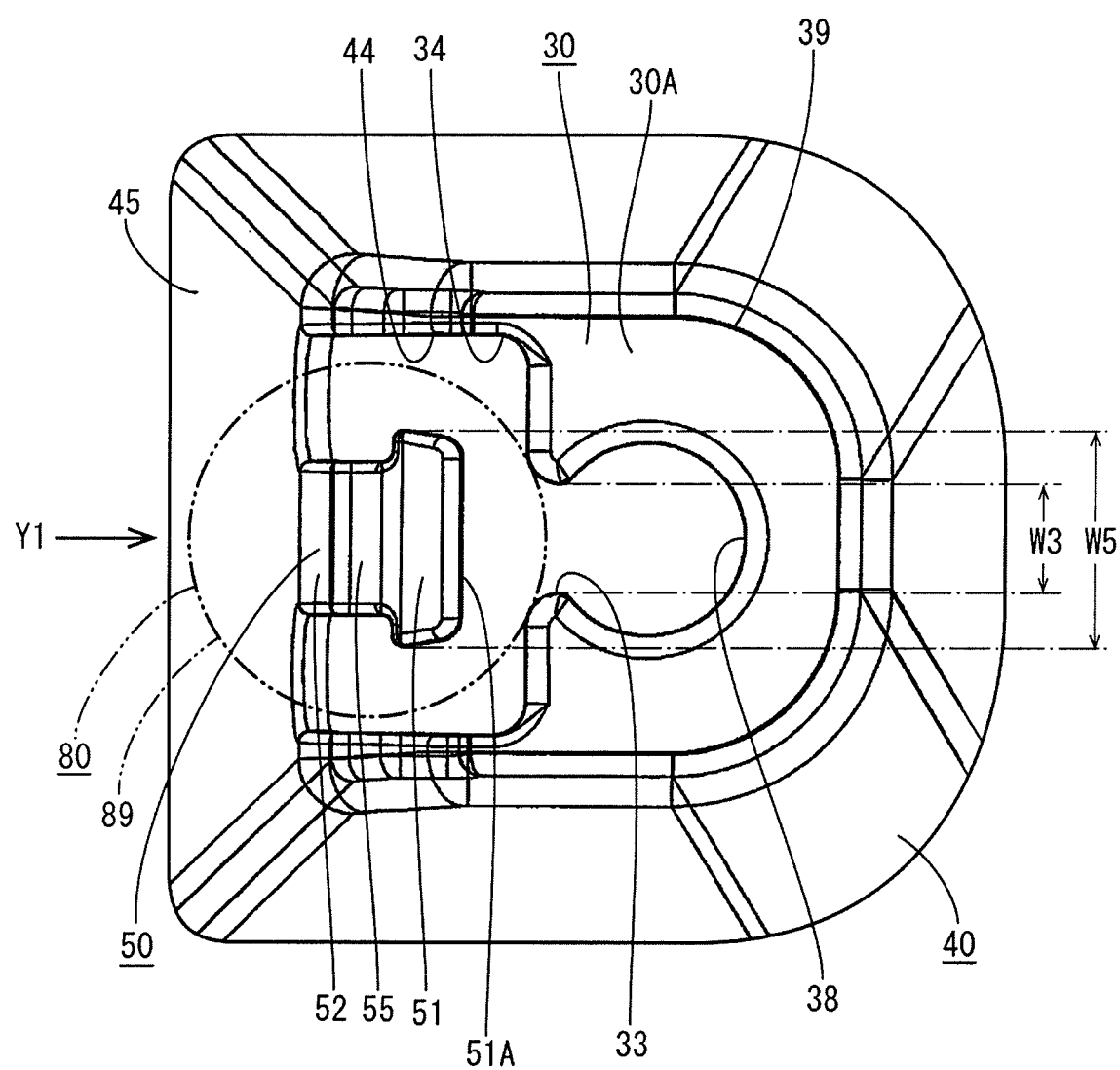
FIG. 4 is a plan view of the clip mounting seat and the clip of FIG. 3 seen from an upper side of the clip mounting seat (only the leg portion of the clip is schematically illustrated).
Figure 5:
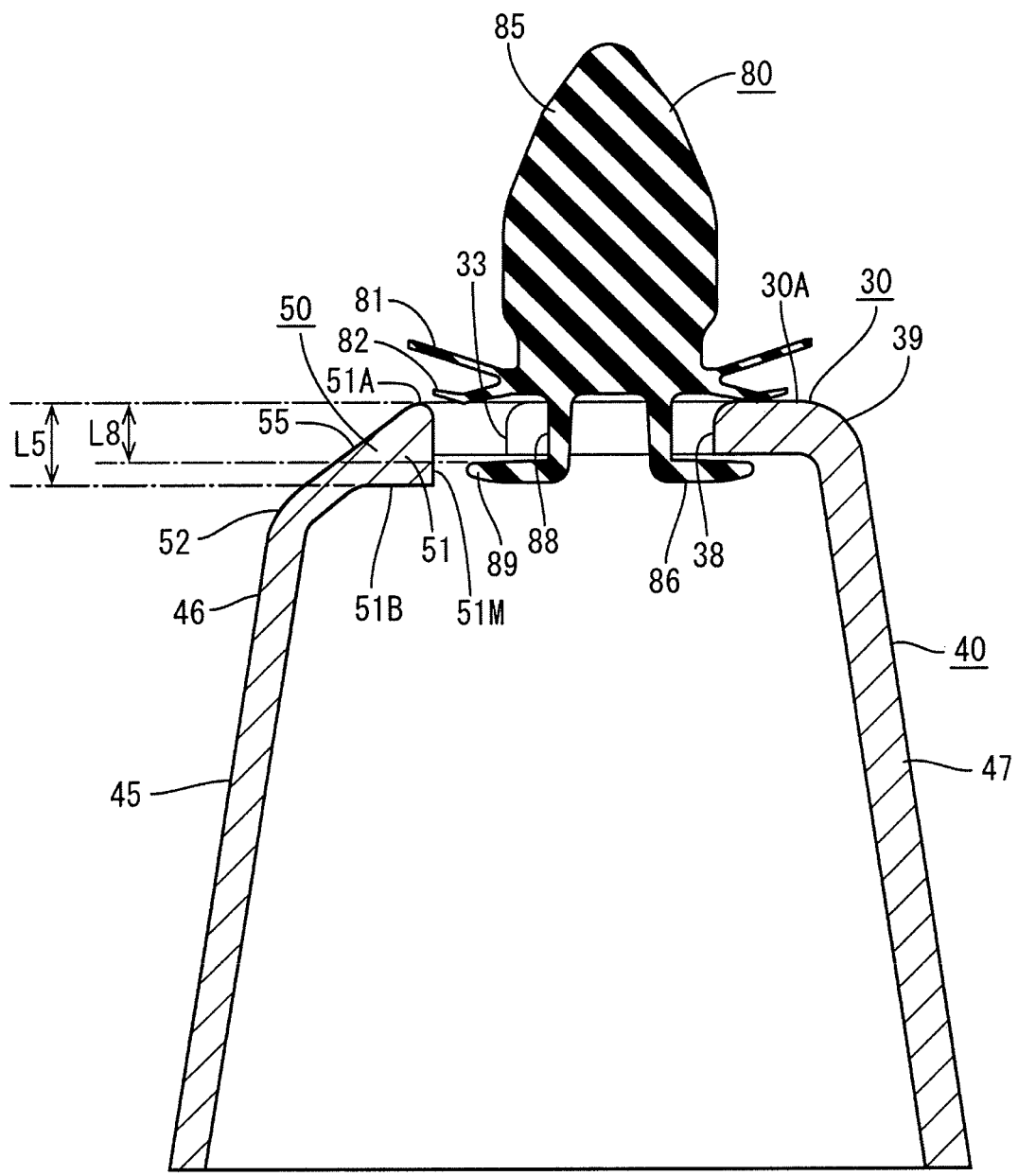
FIG. 5 is a cross-sectional view illustrating the clip mounting seat and the clip that is mounted in a mounting hole (a cut position is along line X-X in FIG. 1).
Figure 6:
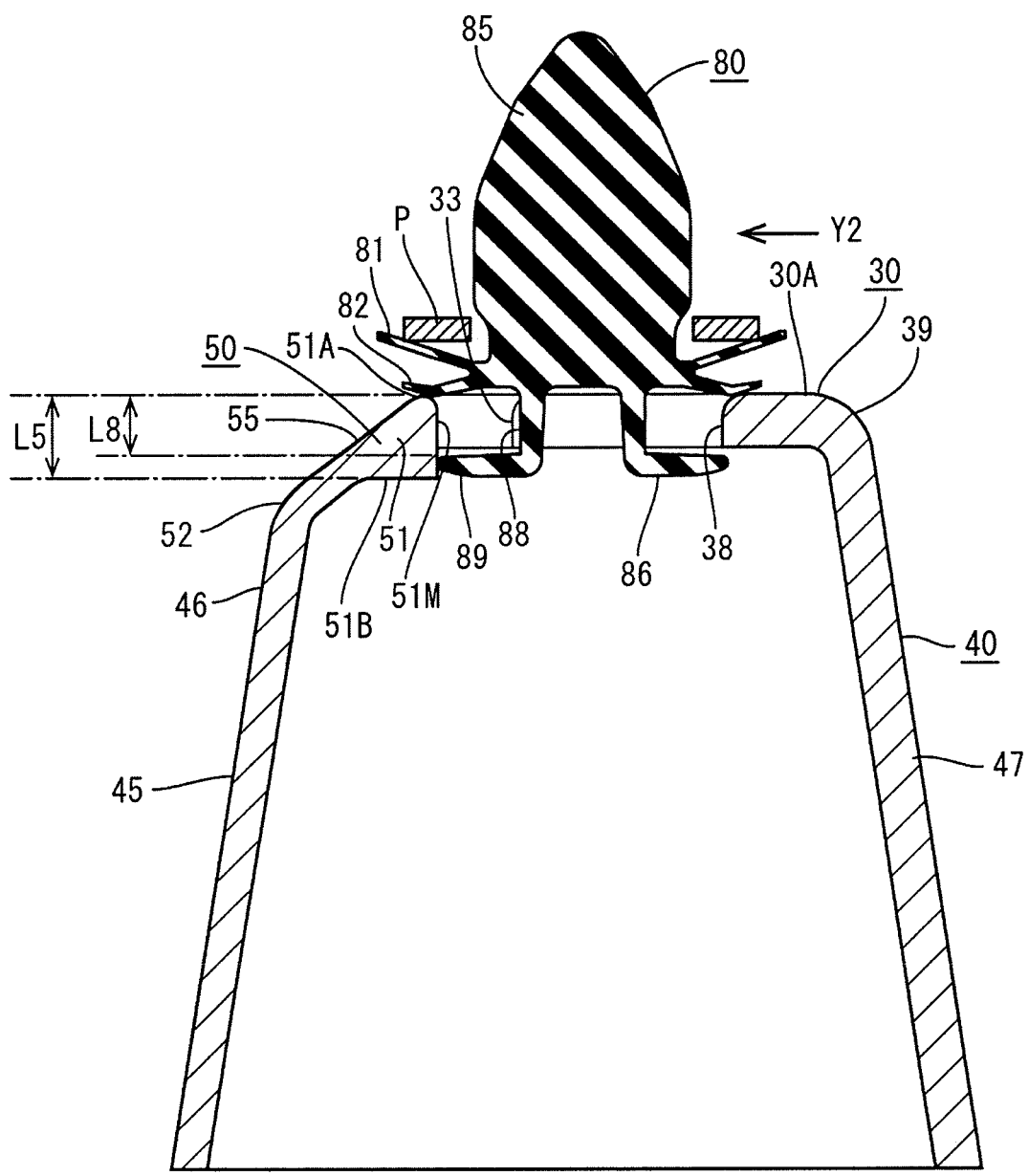
FIG. 6 is a cross-sectional view illustrating the clip mounting seat and the clip that is stopped by the guide member and the leg portion of the clip is contacted with an end surface of the guide member.

As illustrated in FIG. 4, the guide member 50 has a width W5 at the end portion 51 and the width W5 is greater than a width of the base portion 52 and also greater than an opening width W3 of the mounting base-side insertion opening 33. Furthermore, as illustrated in FIG. 5, the end portion 51 of the guide member 50 has an end surface 51M that is opposite the mounting base-side insertion opening 33. The end portion 51 has a thickness L5 or the end surface 51M has a height L5 and the dimension L5 is greater than a distance L8 between a leg portion 89 of the clip 80 and a second flange member (a support portion) 82. As illustrated in FIG. 2, the guide member 50 has a height (a length) such that an upper end surface 51A that is a top of the guide member 50 is substantially at a same level as an upper surface 30A of the mounting base 30. The thickness L5 of the guide member 50 at the end surface 51M is greater than a thickness of the mounting base 30. A lower surface 51B of the end portion 51 of the guide member 50 is at a lower level than a lower surface of the mounting base 30. As illustrated in FIGS. 5 and 6, the leg portion 89 is opposite the end surface 51M of the end portion 51 while the clip 80 being mounted in the mounting hole 38. Namely, the leg portion 89 is at a higher level than a lower surface 51B of the end portion 51. The leg portion 89 overlaps the end portion 51 with respect to the insertion direction Y1.

As illustrated with a cross-sectional view in FIG. 2, the clip 80 includes a head portion 85, a shaft portion 88, and the leg portion 89. The clip 80 further includes a first flange member 81 and the second flange member (the support portion) 82 that are upwardly away from the leg portion 89 with predetermined distances, respectively. The first flange member 81, the second flange member 82, and the leg portion 89 extend outwardly from the shaft portion 88 and have a circular plan-view shape (the leg portion 89 is illustrated in FIG. 4).

Next, a method of mounting the clip 80 will be described. When the clip 80 is being mounted in the clip mounting seat 10, as illustrated in FIG. 2, the leg portion 89 of the clip 80 is contacted with the inclined surface 55 of the guide member 50. If the clip 80 that is contacted with the inclined surface 55 is further moved in the Y1 direction and the horizontal direction, the leg portion 89 of the clip 80 presses the guide member 50 downwardly and the guide member 50 is elastically deformed as illustrated in FIG. 3. If the clip 80 is further moved in the Y1 direction, the clip 80 moves over the guide member 50 and is inserted straight into the mounting hole 38 through the wall-side insertion holes 44, the insertion hole 34, and the mounting base-side insertion opening 33 (refer FIG. 5). Thus, the leg portion 89 of the clip 80 is contacted with the inclined surface 55 and moves along the inclined surface 55 and therefore, the clip 80 easily slides on the inclined surface 55.

The guide member 50 is just in front of the mounting base-side insertion opening 33, and the mounting hole 38, the mounting base-side insertion opening 33, and the guide member 50 are arranged on a same line in the plan view. According to such a configuration, the clip 80 is less likely to be inserted obliquely with respect to the insertion hole 34, the mounting base-side insertion opening 33, or the mounting hole 38.

A bottom surface 86 of the leg portion 89 is guided by the wide end portion 51 and therefore, when the clip 80 is inserted in the mounting hole 38, an insertion load applied to the guide member 50 can be supported stably with the wide end portion 51. Therefore, the clip 80 is less likely to be tilted or displaced from a correct position for insertion to the mounting hole 38 during the insertion process. The clip 80 is fixed to the mounting base 30 such that the shaft portion 88 is inserted in the mounting hole 38 and the second flange member (the support portion) 82 is placed on the upper surface 30A of the mounting base 30 and the second flange member 82 and the leg portion 89 sandwich the mounting base 30 therebetween. In the configuration of the clip 80 mounted in the mounting hole 38, a part of the leg portion 89 of the clip 80 that is at the mounting base-side insertion opening 33 is opposite the end portion 51 of the guide member 50 with respect to the insertion direction and other part of the leg portion 89 is below the mounting base 30.

As described before, when the clip 80 is mounted in the mounting hole 38, the leg portion 89 is opposite the end surface 51M of the end portion 51 and overlaps the guide member 50 in the horizontal direction. Namely, the leg portion 89 is at a higher level than the lower surface 51B of the end portion 51. According to such a configuration, as illustrated in FIG. 6, if a force in the Y2 direction is applied to the clip 80 that is mounted in the clip mounting seat 10 and the clip 80 is to be moved out of the mounting hole 38 of the mounting base 30 through the mounting base-side insertion opening 33 and is likely to be detached from the mounting hole 38, the leg portion 89 hits the guide member 50 that extends from the upper edge 46 of the insertion-side wall 45 obliquely toward the mounting base-side insertion opening 33 and the mounting hole 38. Namely, the guide member 50 functions as a stopper and prevents the clip 80 from being detached from the mounting base 30. Specifically, even if the force in the Y2 direction is applied to the clip 80 that is in the mounting hole 38, the clip 80 hits the end surface 51M of the guide member 50 and is not moved further in the Y2 direction. Therefore, the clip 80 is less likely to be moved out of the mounting hole 38 and is less likely to be detached from the mounting base 30.

Especially, the thickness L5 of the end portion 51 at the end surface 51M is greater than the distance L8 between the leg portion 89 and the second flange portion (the support portion) 82 of the clip 80. According to such a configuration, the leg portion 89 of the clip 80 that is to be moved out of the mounting hole 38 hits the end surface 51M of the guide member 50 and stays in the mounting hole 38. The width W5 of the end portion 51 of the guide member 50 is greater than the opening width W3 of the mounting base-side insertion opening 33. According to such a configuration, the leg portion 89 of the clip 80 that is to be moved out of the mounting hole 38 through the mounting base-side insertion opening 33 is likely to hit the end surface 51M of the guide member 50.

<Operations and Advantageous Effects>

According to the clip mounting seat 10 of this embodiment, the clip 80 is inserted in the mounting hole 38 of the mounting base 30 through the wall-side insertion holes 44, the insertion hole 34, and the mounting base-side insertion opening 33. The insertion-side wall 45 includes the guide member 50 that extends toward the mounting hole 38 and is adjacent to the wall-side insertion holes 44 and opposite the mounting base-side insertion opening 33 with respect to the insertion direction of the clip 80. According to such a configuration, the clip 80 can be guided in a predetermined direction and insertion errors of the clip 80 are less likely to be caused.

According to the increase of the width W5 of the guide member 50, the first contact position of the clip 80 that is contacted with the guide member 50 first when the clip 80 is inserted is likely to be varied. However, the guide member 50 is inclined with respect to the mounting base 30 according to this embodiment and therefore, the clip 80 can be guided with the guide member 50 in the insertion direction Y1 toward the mounting base-side insertion opening 33 easily and stably and the clip 80 can be mounted in the mounting hole 38 with a correct posture. With the guide member 50 having such a configuration, the insertion errors of the clip 80 are less likely to be caused and the clip 80 can be mounted in the mounting hole 38 with a correct posture. Therefore, the clip 80 that is mounted in the mounting hole 38 once is less likely to be detached from the mounting base 30.

As illustrated in FIGS. 5 and 6, the guide member 50 is bent at the base portion 52 that extends from the insertion-side wall 45 and extends therefrom toward the mounting hole 38. The thickness L5 of the guide member 50 at the end portion 51 is greater than the distance L8 between the leg portion 89 and the support portion (the second flange portion 82) of the clip 80. According to such a configuration, the clip 80 that is once inserted in the mounting hole 38 is less likely to be detached from the mounting base 30.

As described before, when the clip 80 is arranged in the mounting hole 38, the leg portion 89 is opposite the end surface 51M of the end portion 51. Namely, the leg portion 89 is at a higher level than the lower surface 51B of the end portion 51. According to such a configuration, even if the force in the Y2 direction is applied to the clip 80 arranged in the mounting hole 38, the clip 80 hits the end surface 51M of the guide member 50, as illustrated in FIG. 6, and is not moved further in the Y2 direction. Therefore, the clip 80 is not removed from the mounting hole 38 and is less likely to be detached from the mounting base 30.

The leg portion 89 of the clip 80 hits the end surface 51M of the guide member 50 and the guide member 50 functions as the stopper and pushes back the clip 80 that is to be detached from the mounting base 30 and restricts occurrence of detachment of the clip 80. The end portion 51 of the guide member 50 is less likely to be inserted into a space between the leg portion 89 and the support portion 82 of the clip 80. Therefore, the clip 80 is less likely to be moved out of the mounting hole 38 and can be held in the mounting hole 38 with an ideal posture.

Generally, in a configuration that the end portion of the guide member is bent and extends closer to the mounting hole, if the clip that is once mounted in the mounting hole is to be moved out of the mounting hole through the mounting base-side insertion opening, the end portion (a bent portion) of the guide member is likely to enter a space between the leg portion of the clip and the support portion. Therefore, the clip is likely to be displaced from the correct position due to the movement of the clip into the space. However, according to this embodiment, the thickness L5 of the end portion 51 is greater than the distance L8 between the leg portion 89 and the support portion (82) of the clip 80. Therefore, such a displacement and the insertion errors of the clip are less likely to be caused.

What is claimed is:

1. A clip mounting seat in which a clip is mountable thereto, the clip mounting seat comprising:
    a mounting base having an outer edge, a mounting hole in which the clip is mountable thereto, and a mounting base-side insertion opening that is included at a part of a hole edge of the mounting hole and through which the clip is insertable to the mounting hole;
    a wall extending downward from the outer edge of the mounting base and including an insertion-side wall having a wall-side insertion hole that is communicated with the mounting base-side insertion opening; and
    a guide member included in the insertion-side wall and extending from the insertion-side wall toward the mounting hole, the guide member being adjacent to the wall-side insertion hole and opposite the mounting base-side insertion opening with respect to an insertion direction in which the clip is insertable to the mounting hole,
    the guide member being configured to guide the clip in the insertion direction and including an end portion that is opposite the mounting base-side insertion opening and has a thickness greater than a distance between a leg portion and a support portion of the clip, the leg portion extending in a flange form in a direction crossing a shaft direction of the clip and the support portion extending in a flange form in the direction crossing the shaft direction and being away and upward from the leg portion.

2. The clip mounting seat according to claim 1, wherein when the clip is mounted in the mounting hole, a part of the leg portion of the clip that is at the mounting base-side insertion opening is opposite the end portion of the guide member with respect to the insertion direction and another part of the leg portion is below the mounting base.

3. The clip mounting seat according to claim 1, wherein the end portion has an inclined surface on an upper surface thereof and the inclined surface is inclined upward from a base portion of the guide member toward the mounting base-side insertion opening.

4. The clip mounting seat according to claim 1, wherein an upper surface of the mounting base is substantially at a same level as an upper end surface of the end portion of the guide member.

5. The clip mounting seat according to claim 1, wherein a lower surface of the end portion of the guide member is at a lower level than a lower surface of the mounting base.

6. The clip mounting seat according to claim 1, wherein the leg portion overlaps the end portion with respect to the insertion direction.

7. The clip mounting seat according to claim 1, wherein the end portion of the guide member with respect to an extending direction thereof is provided by bending the guide member such that the end portion is closer to the mounting hole.

8. The clip mounting seat according to claim 1, wherein
the guide member includes a base portion that is continuous from the insertion-side wall and the end portion that is continuous from the base portion, and
the end portion has a width that is greater than the opening width of the mounting base-side insertion opening.

9. The clip mounting seat according to claim 8, wherein the end portion has a thickness greater than that of the base portion.

10. A system comprising:
the clip mounting seat according to claim 1; and
the clip that is mountable to the clip mounting seat.

11. A clip mounting seat in which a clip is mountable thereto, the clip mounting seat comprising:
a mounting base having an outer edge, a mounting hole in which the clip is mountable thereto, and a mounting base-side insertion opening that is included at a part of a hole edge of the mounting hole and through which the clip is insertable to the mounting hole;
a wall extending downward from the outer edge of the mounting base and including an insertion-side wall having a wall-side insertion hole that is communicated with the mounting base-side insertion opening; and
a guide member included in the insertion-side wall and extending toward the mounting hole, the guide member being adjacent to the wall-side insertion hole and opposite the mounting base-side insertion opening with respect to an insertion direction in which the clip is insertable to the mounting hole,
the guide member being configured to guide the clip in the insertion direction and including an end portion that is opposite the mounting base-side insertion opening and has a thickness greater than a distance between a leg portion and a support portion of the clip, the leg portion extending in a flange form in a direction crossing a shaft direction of the clip and the support portion extending in a flange form in the direction crossing the shaft direction and being away and upward from the leg portion,
wherein the end portion of the guide member with respect to an extending direction thereof is provided by bending the guide member such that the end portion is closer to the mounting hole.

12. A system comprising:
the clip mounting seat according to claim 11; and
the clip that is mountable to the clip mounting seat.

13. A clip mounting seat in which a clip is mountable thereto, the clip mounting seat comprising:
a mounting base having an outer edge, a mounting hole in which the clip is mountable thereto, and a mounting base-side insertion opening that is included at a part of a hole edge of the mounting hole and through which the clip is insertable to the mounting hole;
a wall extending downward from the outer edge of the mounting base and including an insertion-side wall having a wall-side insertion hole that is communicated with the mounting base-side insertion opening; and
a guide member included in the insertion-side wall and extending toward the mounting hole, the guide member being adjacent to the wall-side insertion hole and opposite the mounting base-side insertion opening with respect to an insertion direction in which the clip is insertable to the mounting hole,
the guide member being configured to guide the clip in the insertion direction and including an end portion that is opposite the mounting base-side insertion opening and has a thickness greater than a distance between a leg portion and a support portion of the clip, the leg portion extending in a flange form in a direction crossing a shaft direction of the clip and the support portion extending in a flange form in the direction crossing the shaft direction and being away and upward from the leg portion, wherein
the guide member includes a base portion that is continuous from the insertion-side wall and the end portion that is continuous from the base portion, and
the end portion has a width that is greater than the opening width of the mounting base-side insertion opening.

14. The clip mounting seat according to claim 13, wherein the end portion has a thickness greater than that of the base portion.

15. A system comprising:
the clip mounting seat according to claim 13; and
the clip that is mountable to the clip mounting seat.

* * * * *